Oct. 21, 1958 K. G. HART 2,856,947
FLAPPER-NOZZLE VALVE SYSTEM
Filed Oct. 17, 1957
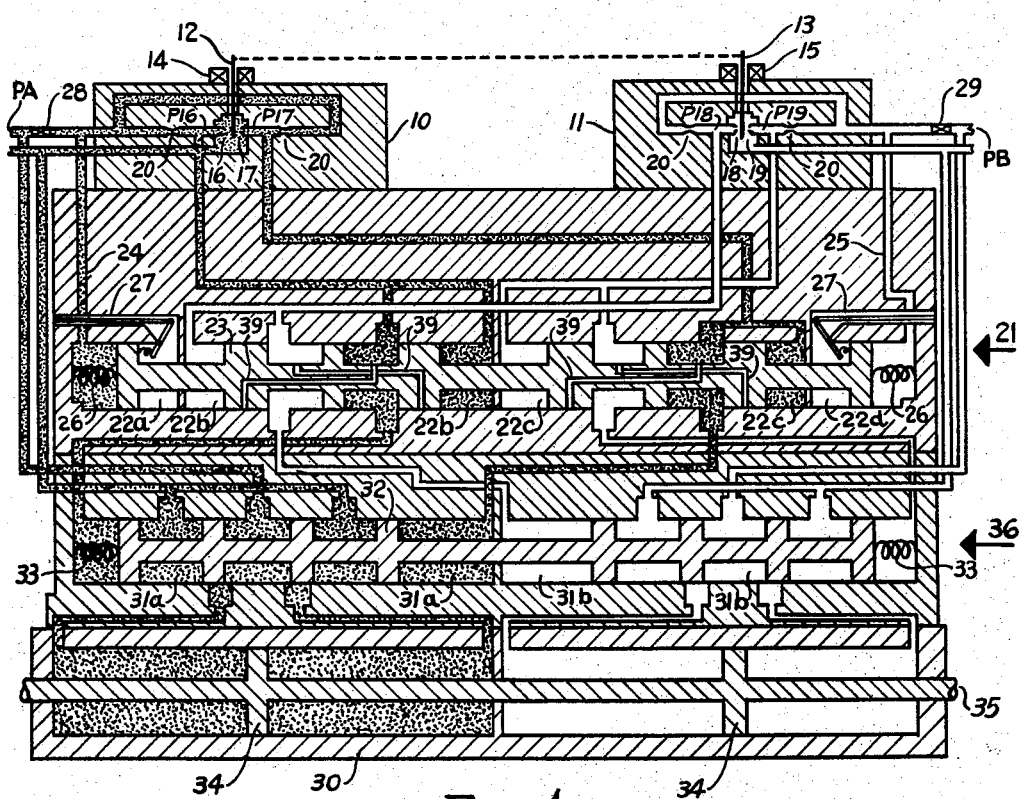
FIG_1
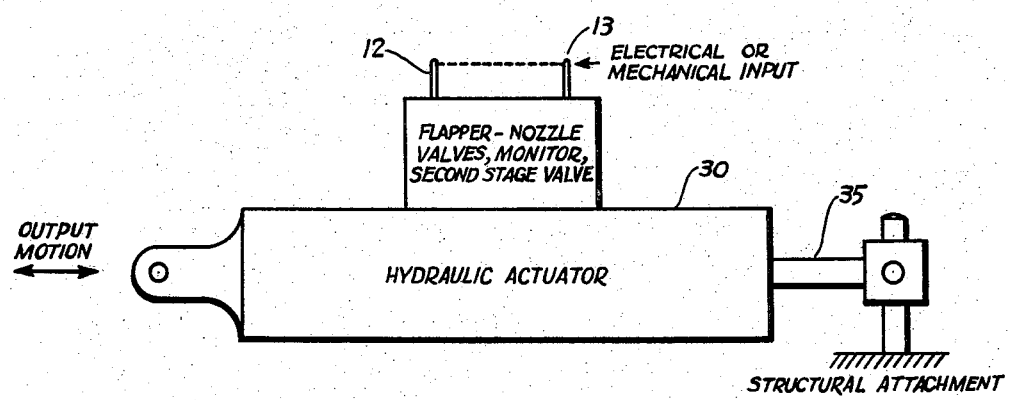
FIG_2
INVENTOR.
KENNETH G. HART.
BY
ATTORNEY.

United States Patent Office 2,856,947
Patented Oct. 21, 1958

2,856,947

FLAPPER-NOZZLE VALVE SYSTEM

Kenneth G. Hart, San Diego, Calif., assignor to General Dynamics Corporation, San Diego, Calif., a corporation of Delaware Application October 17, 1957, Serial No. 690,801

8 Claims. (Cl. 137—84)

The present invention relates to a flapper-nozzle valve hydraulic system and more particularly to a flapper-nozzle valve system having a monitor which closes off a flapper valve when it becomes inoperative.

The two stage electrohydraulic flapper-nozzle valve has found wide spread use in industry since its invention a few years ago. This has been especially true in the aeronautical field, because the low weight and high speed of response of the electrohydraulic valve actuator combination are ideally suited to the requirements of automatic flight control systems. In addition, the electrohydraulic valve provides a convenient method of coupling the "computer" portion of an automatic flight control system to the actuating portion, since the former is almost always electronic in nature and the latter is usually hydraulic. Recently, new uses have been found for the two stage flapper-nozzle valve in systems which do not require the conversion of electrical energy to hydraulic energy, but which do require a valve with extremely low input force levels. In these applications the flapper is actuated directly by means of a force applied to an extension of the flapper which protrudes through the valve body.

One of the basic disadvantages of the flapper-nozzle valve which has somewhat limited its usefulness in both flight control and commercial applications has been its susceptibility to clogging by dirt contained in the hydraulic fluid. When a nozzle becomes plugged, the valve may apply full output pressure to the hydraulic actuator, resulting in full amplitude motion. Although the hydraulic fluid applied to the valve is always well filtered, the possibility always exists, for any practical filter, that a particle large enough to plug the valve may pass through the filter.

As a result of the above disadvantage, flight control system designers have been reluctant to make use of the flapper-nozzle valve in manned aircraft configurations where a plugged nozzle could cause dangerous or fatal changes in the airplane attitude. For present airplane applications, safety is insured by limiting flapper valve actuator stroke to such a low value that no dangerous maneuver can result from sudden full actuator motion. This is normally accomplished by means of mechanical stops. Use of fixed stops is not a very satisfactory method of providing safety, however, since the hydraulic actuator stroke required in normal maneuvering at low speed is often sufficient to cause a fatal maneuver if applied suddenly at high speed. Thus the designer is forced to use the extremely complicated moving stop configuration, or to develop a maneuver limiting device, or to restrict the use of the flapper-nozzle valve to stability augmentors where the required stroke is usually quite small.

It is clear that the usefulness of the flapper-nozzle valve would be greatly enhanced if the valve could be made "fail safe." The present invention accomplishes this. It does so by using a pair of flapper nozzle valves and a monitor which compares the nozzle pressures of one valve with the nozzle pressures of the other valve. These nozzle pressures would practically be balanced during normal operation of this system. However, if one nozzle becomes plugged the pressures are no longer equal and the monitor reacts by shutting the plugged flapper-nozzle valve out of the system, leaving the remaining properly functioning flapper-nozzle valve in the system. Since two flapper-nozzle valves are used, this system can provide additional safety by utilizing the two independent hydraulic sources common to most aircraft, one for each flapper-nozzle valve. The monitor will detect failure of either source and close the corresponding flapper-nozzle valve out of the system, allowing the system to continue operating.

An object of the present invention is to provide a safe flapper-nozzle valve system.

Another object is to provide a flapper-nozzle valve system which will not become inoperative due to a plugged nozzle.

Another object is to provide a flapper-nozzle valve system which can operate using two independent hydraulic systems and which will continue to operate after the failure of one of those systems.

Other objects and features of the present invention will be readily apparent to those skilled in the art from the following specification and appended drawings wherein is illustrated a preferred form of the invention, and in which:

Figure 1 is a cross sectional view of the invention showing two flapper-nozzle valves, a monitor, a dual second stage valve, and a dual actuator.

Figure 2 is a sketch illustrating a typical application of the present invention.

In Figure 1, the flapper-nozzle valves 10 and 11 have flappers 12 and 13 which protrude from the valve bodies. The flappers are mechanically connected and may be actuated by either electrical or mechanical inputs. As shown in Figure 1, electrical torque motors 14 and 15 may be used to actuate the flappers. The position of the flappers controls the pressures $P_{16}$, $P_{17}$, $P_{18}$, $P_{19}$ in the areas between the nozzles 16, 17, 18, 19 and fixed orifices 20. Two independent hydraulic sources are used, the fluid from one being identified by the small dots while the hydraulic lines of the other are left blank. The line pressure $P_A$ corresponds to the dotted hydraulic lines and the line pressure $P_B$ corresponds to the blank hydraulic lines. Filters 28 and 29 are used to filter the hydraulic fluid. The monitor, generally indicated by arrow 21, contains a spool chamber which is divided into four sub-chambers $22_a$, $22_b$, $22_c$, $22_d$ and a movable spool 23 within the sub-chambers. Hydraulic lines or passages lead from the areas behind the nozzles to the monitor spool sub-chambers $22_b$ and $22_c$. Hydraulic lines 24 and 25 lead from the areas preceding the fixed orifices 20 to the end sub-chambers $22_a$ and $22_d$. The end sub-chambers contain spool centering springs 26 and spool position indicators 27 at each end of the spool. The second stage valve, generally indicated by arrow 36, contains a spool chamber, divided into 2 sub-chambers $31_a$ and $31_b$, a spool 32, and spool centering springs 33. Hydraulic lines lead from the monitor to the second stage valve sub-chambers in such a manner that pressures $P_{16}$ and $P_{19}$ are transmitted to sub-chambers $31_a$ and $31_b$ respectively and pressures $P_{17}$ and $P_{18}$ are transmitted to sub-chambers $31_a$ and $31_b$ respectfully. The actuator 30 is hydraulically connected to the second stage valve, and displacement of the second stage valve spool ports hydraulic fluid, under pressure, to one side of each of the pistons or lands 34 in the dual hydraulic actuator. As shown in the typical application illustrated in Figure 2, the actuator piston rod 35 is attached to the airplane structure and the chamber with attached second stage valve, etc. is the portion that moves. This movement can be utilized either directly or indirectly to provide aircraft control surface deflection to maneuver or stabilize an airplane. This system is equally adaptable to other applications and is not limited to movement of aircraft control surfaces. In operation, displacement of the mechanically connected flappers by either mechanical or electrial means causes an unbalance of hydraulic pressures between the areas behind the nozzles of each flapper valve. This unbalance in pressure is transmitted through the monitor to the ends of the second stage valve spool and causes the spool to move against a spool centering spring until the centering spring force equals the hydraulic force. Displacement of the second stage valve spool ports hydraulic fluid, under pressure, to one side of each of the pistons or lands in the dual hydraulic actuator. When the hydraulic actuator piston rod is attached to airplane structure as shown in Figure 2, the pressure difference across the pistons causes the entire actuator to move at a velocity proportional to flapper valve displacement.

This system generally is used as a servomechanism for mechanical inputs, with motion of the hydraulic actuator tending to reduce the flapper valve displacement which initiated the motion. For electrical inputs, hydraulic actuator position must be fed back electrically if the device is to function as a servo-mechanism. It can be seen from the above discussion, and from Figure 1, that if one of the flapper valve nozzles should become plugged by a particle of dirt or other foreign object, the resulting pressure unbalance could cause maximum velocity and displacement of the hydraulic actuator if the second stage valve were connected directly to the flapper valves. This displacement could, for some conditions of flight, cause dangerous or fatal changes in airplane attitude.

The flapper valve monitor provides protection against a plugged or restricted nozzle. The resulting unbalance in pressure acting on the lands of the monitor spool would cause the spool to move in a direction to shut off the hydraulic path between the plugged flapper valve and the second stage valve without affecting the action of the properly functioning valve. Referring to Figure 1, it can be seen that the monitor compares pressure $P_{16}$ to $P_{18}$ and $P_{17}$ to $P_{19}$. When the flapper valves are operating normally, these pressures are always approximately equal ($P_{16} \approx P_{18}$ and $P_{17} \approx P_{19}$). The monitor centering springs are preloaded to a value sufficiently high that normal variations between $P_{16}$ and $P_{18}$ and between $P_{17}$ and $P_{19}$ due to valve dissimilarities will not cause motion of the monitor spool. If one of the nozzles becomes plugged, however, the above pressures are no longer equal. For example, if nozzle 16 is plugged, $P_{16}$ becomes greater than $P_{18}$. Since $P_{17}$ and $P_{19}$ are still approximately equal and $P_A$ equals $P_B$, an unbalance of pressures exists on the monitor spool (since $P_{16}$ is larger than $P_{18}$) which will move the monitor spool to the left, cutting off the hydraulic path between flapper valve 10 and the second stage valve.

The small passages 39 with the monitor spool serve the purpose of connecting the unfailed flapper valve to both ends of that half of the second stage valve spool which is normally driven by the failed flapper valve. This feature insures that performance of the valve actuator combination will be unchanged even though one flapper valve has ceased functioning because of a plugged nozzle. The pressure chambers at the extreme ends of the monitor spool provide monitor spool motion when pressure is lost in one hydraulic system. For example, assume pressure $P_A$ is lost. Then the pressure in all dotted areas of the figure is reduced to zero, or to some value considerably less than the pressure in the blank areas. The remaining forces acting on the monitor spool are caused by pressures $P_{18}$ and $P_{19}$ acting against $P_B$. Since conventional flapper valves are normally designed to operate with nominal values of $P_{18}$ and $P_{19}$ one-third to one-fourth of system pressure ($P_B$), and since the area against which the pressure $P_B$ is acting is larger than those of $P_{18}$ and $P_{19}$, the monitor spool would move to the left or the assumed condition. This action would cut off valve 10 and hydraulic system A. As suggested by the name, the spool position indicators shown near each end of the monitor spool provide a visual indication of monitor spool position. This feature provides a convenient check of flapper valve failure. Flapper-nozzle valves have, in the past, been used only where their failure could not endanger an airplane, e. g., where the effect of a plugged nozzle could cause only a limited amount of control surface deflection. This limitation has greatly restricted the use of flapper valves. Most electro-hydraulic control valves used at present operate on the flapper valve principle. Use of the present invention should permit the use of these valves to be extended to include those critical processes and operations where failure is either dangerous or expensive, an area from which they have been excluded in the past.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What I claim is:

1. A flapper-nozzle valve hydraulic system comprising interconnected flapper-nozzle valves, said flapper-nozzle valves having hydraulic fluid nozzles and means for controlling the pressure within said nozzles, a second stage valve hydraulically connected to said flapper valves and having means responsive to fluid pressures within said flapper valve nozzles for controlling the flow of fluid through said second stage valve, an actuator hydraulically connected to said second stage valve and responsive to flow of fluid therefrom, and a monitor interposed in the hydraulic paths between said flapper-nozzle valves and said second stage valve, said monitor including means responsive to predetermined pressure differentials between said flapper valve nozzles for altering the flow of fluid through said monitor.

2. A flapper-nozzle valve hydraulic system comprising interconnected flapper-nozzle valves, said flapper-nozzle valves having hydraulic fluid nozzles and flappers for controlling the pressure within said nozzles, a second stage valve hydraulically connected to said flapper-nozzle valves and having a valve spool responsive to fluid pressures within said flapper valve nozzles for controlling the flow of fluid through said second stage valve, an actuator hydraulically connected to said second stage valve and responsive to the flow of fluid therefrom, and a monitor interposed in the hydraulic paths between said flapper-nozzle valves and said second stage valve, said monitor including means responsive to predetermined pressure differentials between said flapper valve nozzles for altering the flow of fluid through said monitor.

3. A flapper-nozzle valve hydraulic system comprising a pair of mechanically interconnected flapper-nozzle valves, said flapper-nozzle valves having hydraulic fluid nozzles and flappers for controlling the pressure within said nozzles, a dual second stage valve hydraulically connected to said flapper-nozzle valves and having a valve spool responsive to fluid pressures within said flapper valve nozzles for controlling the flow of fluid through said dual second stage valve, a dual actuator hydraulically connected to said dual second stage valve and responsive to the flow of fluid therefrom, and a monitor interposed in the hydraulic paths between said flapper-nozzle valves and said dual second stage valve, said monitor having means for comparing nozzle pressures of one flapper-nozzle valve with corresponding nozzle pressures of the other flapper-nozzle valve and means responsive to pressure unbalances indicative of nozzle plugging for shutting off the plugged flapper-nozzle valve without affecting the operation of the properly functioning flapper-nozzle valve, second stage valve, and actuator.

4. A flapper-nozzle valve hydraulic system comprising a pair of mechanically interconnected flapper-nozzle valves using independent sources of pressurized hydraulic fluid, said flapper-nozzle valves having hydraulic fluid nozzles and flappers for controlling the pressure within said nozzles, a dual second stage valve hydraulically connected to said flapper-nozzle valves and having a valve spool responsive to fluid pressures within said flapper valve nozzles for controlling the flow of fluid through said dual second stage valve, a dual actuator hydraulically connected to said dual second stage valve and responsive to the flow of fluid therefrom, and a monitor interposed in the hydraulic paths between said flapper-nozzle valves and said dual second stage valve, said monitor having means for comparing nozzle pressures of one flapper-nozzle valve with corresponding nozzle pressures of the other flapper-nozzle valve and means responsive to pressure unbalances indicative of nozzle plugging or hydraulic pressure failure for shutting off the plugged or pressure-less flapper-nozzle valve without affecting the operation of the properly functioning flapper-nozzle valve, second stage valve, and actuator.

5. A flapper-nozzle valve hydraulic system comprising a pair of mechanically interconnected flapper-nozzle valves using independent sources of pressurized hydraulic fluid, said flapper-nozzle valves having hydraulic fluid nozzles and flappers for controlling the pressure within said nozzles, a dual second stage valve hydraulically connected to said flapper-nozzle valves and having a valve spool responsive to fluid pressures within said flapper valve nozzles for controlling the flow of fluid through said dual second stage valve, a dual actuator hydraulically connected to said dual second stage valve and having a piston responsive to the flow of fluid therefrom, and a monitor interposed in the hydraulic paths between said flapper-nozzle valves and said dual second stage valve, said monitor including a spool responsive to predetermined pressure differentials between nozzles of one flapper-nozzle valve and corresponding nozzles of the other flapper-nozzle valve for altering the flow of fluid through said monitor.

6. A flapper-nozzle valve hydraulic system comprising a pair of mechanically interconnected flapper-nozzle valves, said flapper-nozzle valves having hydraulic fluid nozzles and flappers for controlling the pressure within said nozzles, a dual second stage valve including a spool chamber with movable spool positioned therein by centering springs at each end of said spool, said spool chamber being divided into substantially two sub-chambers with each said chamber being hydraulically connected to a flapper-nozzle valve, said spool being common to both said sub-chambers and responsive to fluid pressures within said flapper valve nozzles for controlling the flow of fluid through said sub-chambers, a dual actuator hydraulically connected to said dual second stage valve and responsive to the flow of fluid therefrom, and a monitor interposed in the hydraulic paths between said flapper-nozzle valves and said dual second stage valve, said monitor having means for comparing nozzle pressures of one flapper-nozzle valve with corresponding nozzle pressures of the other flapper-nozzle valve and means responsive to pressure unbalances indicative of nozzle plugging for shutting off the plugged flapper-nozzle valve without affecting the operation of the properly functioning flapper-nozzle valve, second stage valve, and actuator.

7. A flapper-nozzle valve hydraulic system comprising a pair of mechanically interconnected flapper-nozzle valves, said flapper-nozzle valves having hydraulic fluid nozzles and flappers for controlling the pressure within said nozzles, a dual second stage valve hydraulically connected to said flapper-nozzle valves and having a valve spool responsive to fluid pressures within said flapper valve nozzles for controlling the flow of fluid through said dual second stage valve, a dual actuator hydraulically connected to said dual second stage valve and responsive to the flow of fluid therefrom, and a monitor interposed in the hydraulic paths between said flapper-nozzle valves and said dual second stage valve, said monitor including a spool chamber with movable spool positioned therein by centering springs at each end of said spool, said chamber being divided into substantially four sub-chambers with said spool being common to each, said spool having a shaft with a plurality of lands, said sub-chambers being hydraulically connected to said flapper-nozzle valves and said spool being responsive to predetermined pressure differentials between nozzles of one flapper-nozzle valve and corresponding nozzles of the other flapper-nozzle valve whereby the flow of hydraulic fluid through said monitor may be altered.

8. A flapper-nozzle valve hydraulic system comprising a pair of flapper-nozzle valves, independent sources of pressurized hydraulic fluid, said flapper-nozzle valves each being connected to one of said independent sources, said flapper-nozzle valves each having a pair of oppositely directed hydraulic fluid nozzles with a flapper positioned therebetween for controlling the hydraulic pressure within said nozzles, said flapper-nozzle valves having a flapper position control means, said flappers being mechanically interconnected and substantially identically responsive to said flapper position control means; a dual second stage valve including a spool chamber with movable spool positioned therein by centering springs at each end of said spool, said spool chamber being divided into two sub-chambers with each said chamber being hydraulically connected to a flapper-nozzle valve, said spool forming a shank with a plurality of lands theron, said spool being common to both said sub-chambers and responsive to pressure differentials between corresponding nozzles of different flapper-nozzle valves, said sub-chambers having hydraulic fluid inlets and outlets with the flow therethrough being regulated by said movable second stage spool; a dual actuator hydraulically connected to said dual second stage valve and including a piston responsive to the flow of fluid therefrom; and a monitor interposed in the hydraulic paths between said flapper-nozzle valves and said dual second stage valve, said monitor including a spool chamber with movable spool positioned therein by centering springs at each end of said spool, spool position indicating means engaged with said spool, said monitor spool chamber being divided into substantially four sub-chambers with said spool being common to each, said spool having a shaft and a plurality of lands, said spool having a plurality of inner passages leading from the periphery of said lands to the surface of said shaft, said sub-chambers having a plurality of inlets and outlets with said inlets being hydraulically connected to said flapper-nozzle valves and said outlets being hydraulically connected to said second stage valve, said monitor spool being responsive to predetermined pressure differentials between corresponding nozzles of different flapper-nozzle valves and predetermined pressure differentials between said independent sources of pressurized hydraulic fluid whereby the plugging of a nozzle or failure of a hydraulic source causes said spool to shut said plugged or pressure-less flapper-nozzle valve out of the system and connects the properly functioning flapper-nozzle valve with both sub-chambers of said second stage valve.

No references cited.